(12) United States Patent
Roy et al.

(10) Patent No.: US 11,422,716 B2
(45) Date of Patent: Aug. 23, 2022

(54) SYSTEMS AND METHOD FOR DISTRIBUTED READ/WRITE LOCKING WITH NETWORK KEY VALUES FOR STORAGE DEVICES

(71) Applicant: Samsung Electronics Co., Ltd., Suwon-si (KR)

(72) Inventors: Somnath Roy, San Jose, CA (US); Benixon Arul Dhas, San Jose, CA (US); Ramaraj Pandian, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 16/886,748

(22) Filed: May 28, 2020

(65) Prior Publication Data

US 2021/0318813 A1 Oct. 14, 2021

Related U.S. Application Data

(60) Provisional application No. 63/007,281, filed on Apr. 8, 2020.

(51) Int. Cl.
| | |
|---|---|
| *G06F 21/62* | (2013.01) |
| *G06F 21/78* | (2013.01) |
| *G06F 3/06* | (2006.01) |
| *G06F 9/54* | (2006.01) |
| *G06F 9/48* | (2006.01) |

(52) U.S. Cl.
CPC ............ *G06F 3/0622* (2013.01); *G06F 3/067* (2013.01); *G06F 3/0659* (2013.01); *G06F 9/4881* (2013.01); *G06F 9/546* (2013.01); *G06F 21/6209* (2013.01); *G06F 21/78* (2013.01)

(58) Field of Classification Search
CPC ...... G06F 3/0622; G06F 3/0659; G06F 3/067; G06F 9/4881; G06F 9/546; G06F 21/6209; G06F 21/78
USPC ......................................................... 711/163
See application file for complete search history.

(56) References Cited

U.S. PATENT DOCUMENTS

| | | | |
|---|---|---|---|
| 6,598,068 B1 * | 7/2003 | Clark .................. | G06F 9/52 |
| | | | 718/104 |
| 9,817,703 B1 * | 11/2017 | Ryland ................ | G06F 9/52 |
| 9,959,308 B1 * | 5/2018 | Carman .............. | G06F 16/2365 |
| 2004/0220933 A1 | 11/2004 | Walker | |
| 2006/0136376 A1 | 6/2006 | Jain et al. | |
| 2006/0136516 A1 | 6/2006 | Jain et al. | |
| 2006/0136517 A1 | 6/2006 | Creamer et al. | |
| 2014/0310327 A1 | 10/2014 | Yip et al. | |

(Continued)

*Primary Examiner* — Christopher B Shin
(74) *Attorney, Agent, or Firm* — Lewis Roca Rothgerber Christie LLP

(57) ABSTRACT

Provided is a method of coordinating lock requests in a network key-value (NKV) store including one or more NKV clients and one or more NKV targets, the method including receiving, by a first NKV client, a lock request from a client device over a communication interface to lock an object key stored in one or more of the NKV targets, determining, by the first NKV client, one of the NKV targets corresponding to the lock request, transmitting, by the first NKV client, the lock request to the one of the NKV targets over a storage interface, determining, by the one of the NKV targets, a priority of the lock request, and locking, by the one of the NKV targets, the lock request based on the priority.

20 Claims, 8 Drawing Sheets

(56) References Cited

U.S. PATENT DOCUMENTS

| | | |
|---|---|---|
| 2016/0253512 A1 | 9/2016 | Evers et al. |
| 2017/0163762 A1 | 6/2017 | Nguyen |
| 2018/0218022 A1* | 8/2018 | Mace ................. G06F 16/2343 |
| 2018/0225044 A1 | 8/2018 | Baptist et al. |
| 2019/0129894 A1 | 5/2019 | Peng |
| 2019/0146682 A1* | 5/2019 | Subramanian ........ G06F 3/0611 |
| | | 711/103 |
| 2019/0155795 A1* | 5/2019 | Xiao ........................ G06F 9/52 |

\* cited by examiner

SYSTEMS AND METHOD FOR DISTRIBUTED READ/WRITE LOCKING WITH NETWORK KEY VALUES FOR STORAGE DEVICES

CROSS-REFERENCE TO RELATED APPLICATION

This application claims priority to U.S. Provisional Application Ser. No. 63/007,281, filed on Apr. 8, 2020, entitled DISTRIBUTED READ/WRITE LOCK DESIGN WITH KEY VALUES OVER NON-VOLATILE MEMORY EXPRESS OVER FABRICS, the entire content of which is incorporated herein by reference.

FIELD

One or more aspects of example embodiments of the present disclosure relate generally to a distributed read/write lock design for use with key values over non-volatile memory express over fabrics.

BACKGROUND

A key-value solid state drive (KVSSD) may provide a key-value interface at the device level, thereby providing improved performance and simplified storage management, thereby enabling high-performance scaling, simplification of a conversion process, and extension of drive capabilities. By incorporating a KV store logic within firmware of the KVSSD, KVSSDs are able to respond to direct data requests from an application while reducing involvement of host software. The KVSSD may use SSD hardware that is augmented by using Flash Translation Layer (FTL) software for providing processing capabilities.

The above information disclosed in this Background section is for enhancement of understanding of the background of the present disclosure, and therefore, it may contain information that does not constitute prior art.

SUMMARY

Embodiments described herein provide improvements to data storage.

According to some embodiments of the present disclosure, there is provided a method of coordinating lock requests in a network key-value (NKV) store including one or more NKV clients and one or more NKV targets, the method including receiving, by a first NKV client, a lock request from a client device over a communication interface to lock an object key stored in one or more of the NKV targets, determining, by the first NKV client, one of the NKV targets corresponding to the lock request, transmitting, by the first NKV client, the lock request to the one of the NKV targets over a storage interface, determining, by the one of the NKV targets, a priority of the lock request, and locking, by the one of the NKV targets, the lock request based on the priority. The lock of the stored object key may be a read/write lock. Further, in such a mode of locking, all readers that have a higher priority than any writer can access the object key in parallel while no writing is taking place, and each writer may have exclusive access to the object key that is the subject of the lock request.

The communication interface may include an application programming interface (API).

The storage interface may include a non-volatile memory express over fabrics (NVMeOF) interface.

Determining of the priority of the lock request may include checking, by the one of the NKV targets, a priority queue, and determining, by the one of the NKV targets, the priority of the lock request based on a number of requests in the priority queue.

The method may further include determining, by the one of the NKV targets, that the object key is already locked, and adding, by the one of the NKV targets, the lock request to the priority queue.

The method may further include determining, by the one of the NKV targets, the object key is unlocked, and executing, by the one of the NKV targets, a next lock request from the priority queue in response to the object key being unlocked.

Determining the object key is unlocked may include determining, by the one of the NKV targets, a valid unlock command is received from a correspond NKV target that locked the object key, or determining, by the one of the NKV targets, an epoch is expired for the object key, wherein the object key is unlocked in response to the valid unlock command or the epoch being expired.

The method may further include determining, by the first NKV client, weights for the plurality of specified NKV targets, identifying, by the first NKV client, one of the plurality of specified NKV targets having the largest weight from among the plurality of specified NKV targets, assigning, by the first NKV client, the one having the largest weight as a master lock node, and assigning, by the first NKV client, remaining others from among the plurality of specified NKV targets as a slave lock node, wherein the lock request includes a plurality of specified NKV targets, and wherein the one of the NKV targets corresponds to the master lock node.

Determining the weights may include using a hashing algorithm.

Transmitting the lock request to the one of the NKV targets may include transmitting, by the first NKV client, the lock request to the master lock node, wherein the lock request includes a request that the lock also be held on the slave lock node, and wherein the master lock node transmits the lock request to the slave lock node.

The method may further include transmitting, by the first NKV client, the lock request to the master lock node, determining, by the first NKV client, a timeout, and assigning, by the first NKV client, another one of the plurality of specified NKV targets having a next largest weight from among remaining ones of the plurality of specified NKV targets as a new master lock node, wherein the one of the NKV targets correspond to the new master lock node.

According to other embodiments of the present disclosure, there is provided a non-transitory computer readable medium including instructions that when executed by one or more processors of a non-volatile memory express over fabrics (NVMeOF) key-value (NKV) store including one or more NKV clients and one or more NKV targets, causes the one or more processors to perform a method including receiving a lock request from a client device over a communication interface to lock an object key stored in one or more of the NKV targets, determining one of the NKV targets corresponding to the lock request, transmitting the lock request to the one of the NKV targets over a storage interface, determining a priority of the lock request, and locking the lock request based on the priority.

The communication interface may include an application programming interface (API), and the storage interface includes a non-volatile memory express over fabrics (NVMeOF) interface.

To determine the priority of the lock request, the instructions may further cause the one or more processors to perform the method by checking a priority queue, and determining the priority of the lock request based on a number of requests in the priority queue.

The instructions may further cause the one or more processors to perform the method by determining that the object key is already locked, and adding the lock request to the priority queue.

To determine the object key is unlocked, the instructions may further cause the one or more processors to perform the method by determining a valid unlock command is received from a correspond NKV target that locked the object key, or determining an epoch is expired for the object key, wherein the object key is unlocked in response to the valid unlock command or the epoch being expired.

The lock request may include a plurality of specified NKV targets, wherein the instructions further cause the one or more processors to perform the method by determining weights for the plurality of specified NKV targets using a hashing algorithm, identifying one of the plurality of specified NKV targets having the largest weight from among the plurality of specified NKV targets, assigning the one having the largest weight as a master lock node, and assigning remaining others from among the plurality of specified NKV targets as a slave lock node, wherein the one of the NKV targets corresponds to the master lock node.

To transmit the lock request to the one of the NKV targets, the instructions may further cause the one or more processors to perform the method by transmitting the lock request to the master lock node, wherein the lock request includes a request that the lock also be held on the slave lock node, and wherein the master lock node transmits the lock request to the slave lock node.

The instructions may further cause the one or more processors to perform the method by transmitting the lock request to the master lock node, determining a timeout, and assigning another one of the plurality of specified NKV targets having a next largest weight from among remaining ones of the plurality of specified NKV targets as a new master lock node, wherein the one of the NKV targets correspond to the new master lock node.

According to yet other embodiments of the present disclosure, there is provided a system for coordinating lock requests in a network key-value (NKV) store including one or more NKV clients and one or more NKV targets, the system being configured to receive, by a first NKV client, a lock request from a client device over a communication interface to lock an object key stored in one or more of the NKV targets, determine, by the first NKV client, one of the NKV targets corresponding to the lock request, transmit, by the first NKV client, the lock request to the one of the NKV targets over a storage interface, determine, by the one of the NKV targets, a priority of the lock request, and lock, by the one of the NKV targets, the lock request based on the priority.

Accordingly, embodiments of the present disclosure improve data storage technology by providing underlying storage services that enable an improved lock service, or lock methodology, thereby improving flexibility of design of object storage devices, and thereby improving performance with a functionally correct approach. Further, the use of the lock methodology of the embodiments may be used with applications that guarantee data consistency. Additionally, in the event of one or more target failures during a multi-target lock request, the API of the described embodiments is highly available as long as a majority of the requested targets are available.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
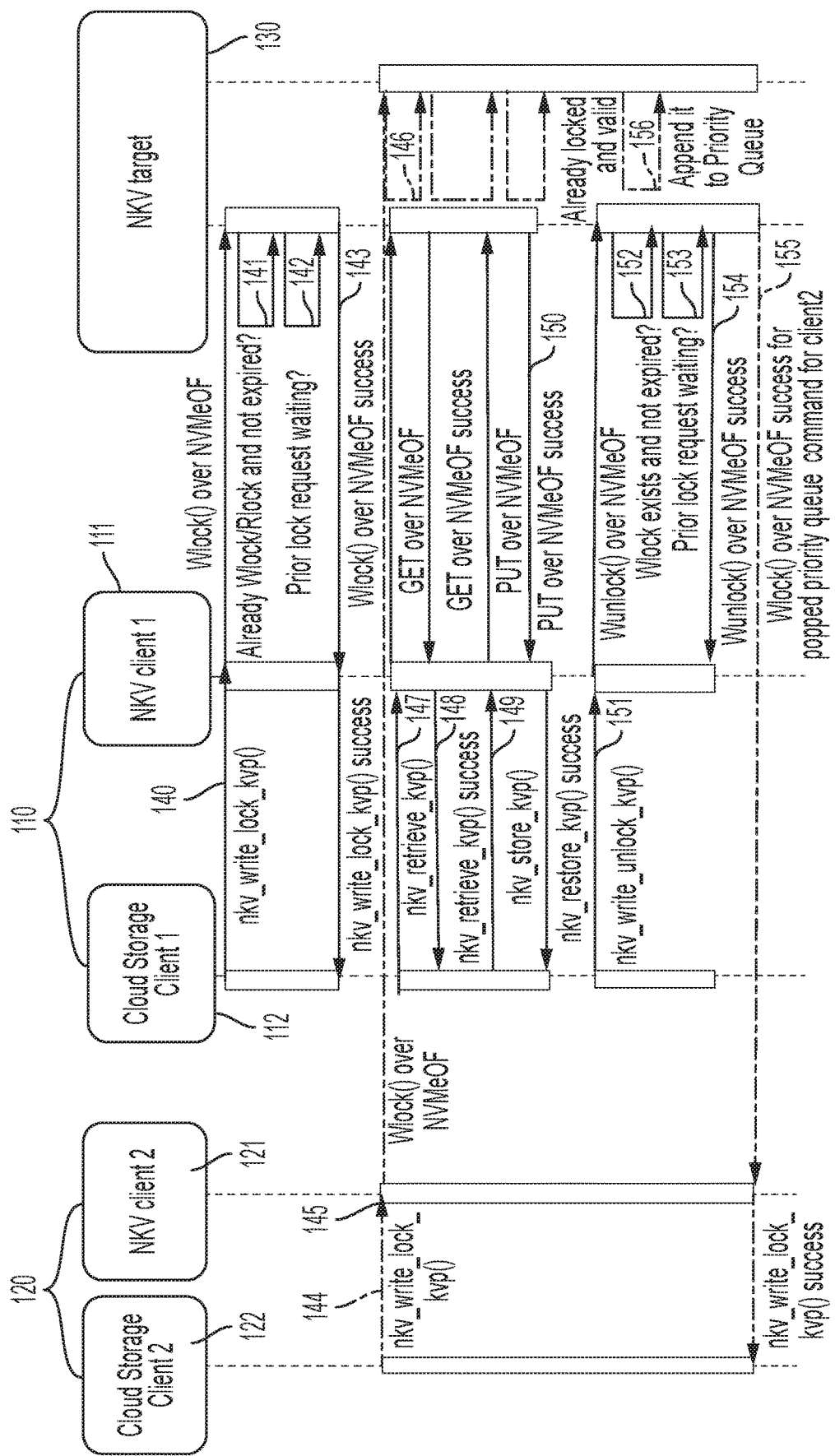
FIG. 1 shows a timing diagram depicting a method for locking and subsequently unlocking data access associated with a client request in a blocking mode according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Distributed object stores that provide data consistency (e.g., distributed object stores that ensure that data is not corrupted in the event of a system crash or in the event the data is accessed by multiple users) may enable data integration to avoid errors that may otherwise arise when multiple end-applications access the same object. That is, data integration may be enabled to ensure that no error occurs due to conflicting write operations when multiple end-applications/clients seek to differently modify the same data object. In a disaggregated shared storage model, where each object storage node is able to access all storage nodes, providing a high level of data integration and data consistency may be difficult without coordination by the target storage nodes.

Furthermore, implementing guaranteed data integration (e.g., to ensure no errors arise due to competing write operations corresponding to the same object) at the object storage software level may generally use coordination between the object storage nodes. Also, because there may be a large number of object storage nodes, scale and performance issues may arise.

Some embodiments of the present disclosure provide a distributed read lock/write lock (e.g., a R/W lock, or, as generally used herein, a "lock" for ensuring that only one client at a time is able to access and/or modify an object of data stored on a target) that is exposed as an application programming interface (API) for key-value (KV) devices. In some embodiments, the lock may be a distributed write lock (a W lock) to ensure that only one client at a time is able to write and/or modify the object, but multiple clients may still be able to access and/or read the locked object in parallel. Accordingly, the embodiments are able to control lock semantics with network key-value command sets (NKV command sets). Although some embodiments of the present disclosure describe the use of a network key-value protocol, it should be noted that the disclosed embodiments may also be implemented with non-volatile memory express over fabrics (NVMeOF) key-value systems, or may be implemented with any other suitable protocol.

The lock APIs provided by some of the embodiments can be used for locking a single NKV target (e.g., a data store or object store), wherein no reads from, or writes to, the single NKV target may occur. The lock API's can be used in scenarios in which multiple clients, or hosts, use a locking methodology with respect to a single NKV target in a cluster of NKV targets (e.g., as described with respect to FIGS. 1-3 below), or can be used for locking several NKV targets in a multi-target mode in which multiple NKV targets exist in the cluster/set (e.g., as described with respect to FIGS. 4 and 5 below), for example, in connection with erasure coding (EC) or replication set/mirroring applications. In some embodiments, although the NKV target may be locked, the NKV target may be locked with respect to only particular data/a particular key (e.g., a locked object), meaning that other keys in the locked NKV target may be accessed and even modified, despite the locked object not being able to be modified while the lock is held. As used herein, a "client" or "host" may refer to NVMe client software that is used to send and receive NVMe commands directly to and from the fabric without use of a translation layer, and a "target" (e.g., an NKV target) may refer to a NVMe storage target, which may have multiple paths between itself and one or more of the hosts (e.g., a NVMe host initiator) that are supported by the fabric. In some embodiments, the NVMe storage target(s) may be implemented as a storage device, for example, such as a solid state drive (SSD). In various embodiments, the NVMe storage target(s) may conform to a large form factor standard (e.g., a 3.5-inch hard drive form-factor), a small form factor standard (e.g., a 2.5-inch hard drive form-factor), an M.2 form factor, an E1.S form factor, and/or the like. In other embodiments, the NVMe storage target(s) may conform to any suitable or desired derivative of these form factors. More generally, the target may be a data store, and the client may be an application seeking to access data stored in the data store. Accordingly, the client/host may conduct read and write operations (e.g., data access operations) with the target via the fabric.

According to some embodiments of the present disclosure, the NKV target(s) may be locked while obviating the need to use quorum logic for acquiring multiple locks across multiple NKV targets. That is, the NKV system, as a distributed system, may obviate the need for a quorum (e.g., a minimum number of corresponding votes) before a distributed transaction is allowed to perform an operation in the NKV system. However, should locking across the NKV targets be useful for some application, the API is available.

For example, according to some embodiments of the present disclosure, applications that perform EC or replication/mirroring from the client side may generally seek to ensure data consistency across the EC or replication set, such that locking across all of the NKV targets may be a useful mechanism. Such applications may use a quorum-based implementation, and if implemented on the client side, may be inefficient as the number of clients may generally be greater (e.g., significantly greater) than the number of NKV targets. According to one or more example embodiments of the present disclosure, a simple target-based quorum scheme may be provided, for example, such that the NKV targets communicate with each other over NVMeOF KV command set to determine a quorum.

Furthermore, the API, in some of the embodiments, may efficiently handle stale locks. Stale locks can refer to a situation in which an NKV client or NKV target obtains a lock, and the NKV client or NKV target suffers from a power outage or otherwise crashes thereafter, such that the NKV client or NKV target is unable to lift or otherwise release the lock (e.g., as described with respect to FIGS. 2, 3, and 5).

Also, the API, in some of the embodiments, may be unaffected by clock skew associated with different NKV clients. For example, clock times between different NKV clients and/or different NKV targets maybe mismatched, and thus, in some embodiments, a counter epoch duration may be used to determine a stale lock. In some embodiments, the API may be configured to analyze lock priority using an efficient priority queue (PQ), and may be able to efficiently resolve "starving issues" (e.g., wherein a client requests a lock that is ungranted) between reader/writer locks.

However, benefits achieved by one or more of the disclosed embodiments may have some tradeoffs. For example, almost all of the lock logic, which is used to determine which lock requests and lock release requests to grant and which to deny, is in the NKV target side, while the client side is mostly a pass-through, meaning that the NKV clients make no determination as to which lock requests to grant or deny. Additionally, implementing similar logic in the client side may be potentially difficult because there may be decreased bandwidth due to additional input/output (IO) traffic, and because maintaining a weighted priority queue at the client side may not be easily achieved.

Further, maintaining an epoch for the detection of stale locks on the client side may be difficult. That is, it may be difficult to set a time frame for which a granted lock request for a given NKV client should be released, or unlocked, due to presumed inactivity from the NKV client that was granted the lock request (e.g., due to a failure of the NKV client to notify the locked NKV target(s) that the lock is no longer requested, which may be caused by the NKV client crashing). The difficulty may result from the client nodes having to agree on the epoch (e.g., the duration of the epoch) to avoid erroneous categorization of legitimate locks as being stale (e.g., to avoid prematurely releasing a legitimate lock that may still be desired by the NKV client). Moreover, any added clients joining a cluster including the client nodes and the NKV target would have to synchronize with respect to the epoch, meaning that additional operations may be used to convey to the added client(s) the in-place protocol for determining when a lock has gone stale. Accordingly, some embodiments of the present disclosure may implement a high-bandwidth scheme for detecting and determining when a lock is actually stale while avoiding prematurely labeling a legitimate lock as being stale, as described below.

Additionally, in some embodiments, the logic may be implemented in memory at the target side to increase the speed at which a granted lock is determined to be stale (e.g., to increase how efficiently stale locks are detected). This may be beneficial as the NKV target may efficiently detect the existence of a stale lock by tracking the active connections (e.g., by keeping track of which NKV clients are actively communicating with the NKV targets, thereby demonstrating an active connection, and preventing an incorrect determination of a granted lock as being stale). Furthermore, such an embodiment may make it easier to handle scenarios in which rebooting of the NKV target is useful, as the NKV target may be rebooted without again granting one or more of the locks that existed at the time the NKV target was powered down due to the locks being determined as stale by the NKV target.

Other considerations relate to the implementation of a fencing mechanism. The fencing mechanism may address a situation in which a client (e.g., a user application seeking to perform a read operation or write operation corresponding to data or an object) successfully holds a lock (e.g., in association with the read operation or the write operation), but due to some event (e.g., network delay, program error, etc.), the lock duration expires (e.g., the validly granted lock is released) prior to completion of the IO operation by the client. Accordingly, in the absence of a fencing mechanism, an NKV client may be prevented from otherwise retaining a legitimate lock that is still desired due to the false detection of a stale lock (e.g., due to time out) while the client begins sending IO therefrom. According to some embodiments of the present disclosure, the above described fencing mechanism can be implemented in the target side. However, it should be noted that other embodiments of the present disclosure may address this potential issue by adjusting the duration of the lock (e.g., by adjusting the epoch).

FIG. 1 is a timing diagram depicting a method for locking and subsequently unlocking data access associated with a client request in a blocking mode according to some embodiments of the present disclosure.

Referring to FIG. 1, some embodiments of the present disclosure may provide underlying storage services to enable one or more clients to access data stored on a target that also enable a lock service (or lock mechanism/lock methodology) for avoiding conflicting data access operations by competing clients. The described lock service may improve flexibility corresponding to the design of object storage devices to be used as a target, and may also improve performance while ensuring data consistency (e.g., while ensuring only a single client is able to modify a data object at any given point in time).

The use of the lock methodology of the disclosed embodiments may include applications that guarantee data consistency. That is, the lock methodology may include CP in the context of the CAP theorem, wherein CAP stands for 1) consistency (e.g., every read receives the most recent write or an error), 2) availability (e.g., every request receives a (non-error) response, without the guarantee that it contains the most recent write), and 3) partition tolerance, and wherein CP corresponds to consistency, in which all clients see the same data at the same time, and partition tolerance, in which the system continues to operate in spite of network failures.

The example provided in FIG. 1 is a timing diagram depicting a method of locking access to data and subsequently unlocking data access associated with a client request in a blocking mode. In a blocking mode, rather than returning an error to a requesting client when a key is already locked, an NKV target may wait for the key to be unlocked by a current application (e.g., a current client), as well as all requests prior to the one by the requesting client (e.g., sitting in a priority queue PQ) to get locked/unlocked, before the requesting client's turn to get the lock and a success response returned.

In the present example, the process may be initiated by a first client 110 (e.g., first cloud storage client 112 and first NKV client 111) requesting an NKV write lock at 140. The first cloud storage client 112 may communicate with the first NKV client 111 using a suitable API as described herein, and the first NKV client 111 may communicate with the NKV target(s) using a suitable storage interface (e.g., using a connector and a protocol), for example, such as NVMeOF. For example, the first cloud storage client 112 may transfer an API command "nkv_write_lock_kvp( )" to the first NKV client 111, which is translated by the first NKV client to a translated command "Wlock( ) over NVMeOF," which can indicate that the first NKV client seeks to perform a write-based lock (e.g., for a particular object kvp( ), such as an object key). However, the present disclosure is not limited thereto, and the NKV clients may communicate with the NKV target(s) using any other suitable storage interface, for example, such as Peripheral Component Interconnect Express (PCIe), remote direct memory access (RDMA) over Ethernet, Small Computer System Interface (SCSI), Serial Attached SCSI (SAS), Serial Advanced Technology Attachment (SATA), Fiber Channel, NVMe, and/or the like.

An NKV target 130 then determines at 141 whether a write lock or a read lock exists (and has not expired), and also determines at 142 whether there is a different lock request that has priority over the request from the first client 110 (e.g., waiting in the PQ). If the answer to both determinations is "no," then the NKV target 130 grants the write lock to the first client 110 at 143 (e.g., returns a success response).

Thereafter, a second client 120 (e.g., a second cloud storage client 122 and a second NKV client 121) requests an NKV write lock at 144 (e.g., for the same object kvp( )). In a manner similar to the first client 110, in the present example, the command "nkv_write_lock_kvp( )" is translated at 145 by the second NKV client 121 to the command "Wlock( ) over NVMeOF" which can indicate to the NKV target 130 that the second NKV client seeks to perform a write-based lock (e.g., for locking the object key). The NKV target 130 then determines at 146 whether a write lock or a read lock already exists (and has not expired), and whether there is a different lock request that has priority over the request from the second client 120 (e.g., waiting in the PQ). In the present example, because of the write lock by the first client 110, the NKV target 130 is able to append the write lock request by the second client 120 in the PQ at 156 for later retrieval.

While or after the NKV target 130 determines at 146 that the previous write lock exists and/or appends the write lock request of the second client 120 in the PQ at 156, the first client 110 may submit a read request, or GET request, at 147 to retrieve the object key (e.g., kvp( )) from the NKV target 130 at 148. The first client 110 may then submit a write request, or a PUT request, at 149 to write the object key back to the NKV target 130 (e.g., thereafter receiving a success response from the NKV target 130 at 150). That is, while the request by the second client 120 is pending (e.g., at 146 or waiting in the PQ), the first client 110 may seek to perform a read-and-writeback operation corresponding to the object key corresponding to the write lock, and the NKV target 130 may allow the read-and-writeback operation to be performed in accordance with the granted write lock.

Once the object key is written back, the first client 110 may submit a request at 151 to the NKV target 130 to release the lock (e.g., to unlock the object key). In the present example, the commands "nkv_write_unlock_kvp( )" and its translation to "Wunlock( ) over NVMeOF" may be used to indicate that the corresponding client (e.g., the first client 110) requests that the NKV target 130 release the previously granted lock (e.g., so that a lock may be available to another client). After again determining whether any lock exists (and has not expired) at 152, and determining whether there is a prior lock (or unlock) request that is waiting at 153 (e.g., waiting in the PQ), the NKV target 130 may release the lock held by the first client 110 at 154.

Finally, once the lock for the first client 110 is released, the NKV target 130 may execute the write lock request of the second client 120 waiting in the PQ (assuming no other requests in the PQ with a higher priority), and may return a success response to the second client 120 at 155, indicating that the write lock request was granted. Accordingly, a priority order of the lock requests may be maintained by the NKV target 130, and resources of the requesting client may be utilized for other tasks instead of tracking error responses and resubmissions of lock requests.

Figure 2:
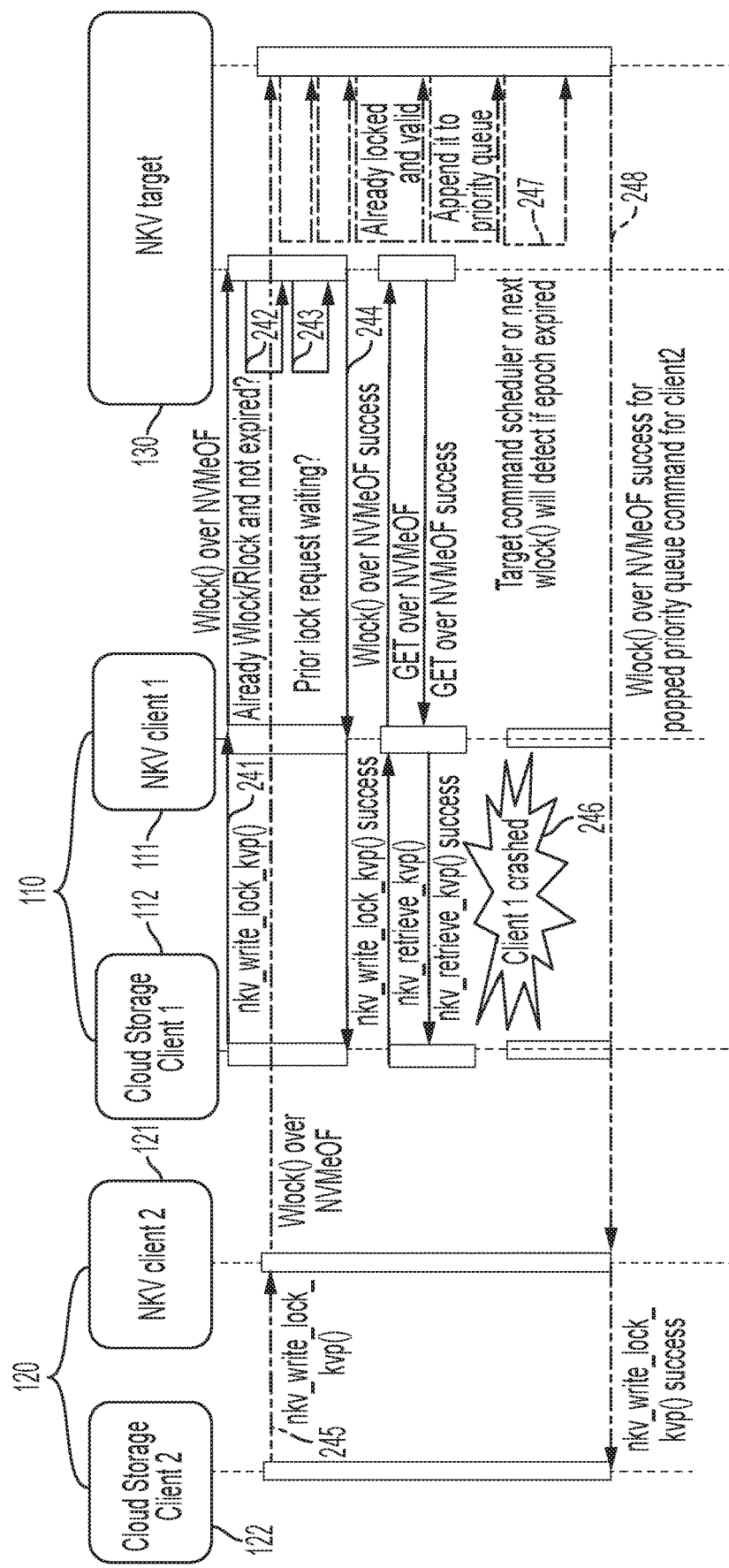
FIG. 2 shows a timing diagram depicting a method for releasing an acquired lock in accordance with a corresponding client crash according to some embodiments of the present disclosure.

FIG. 2 is a timing diagram depicting a method for releasing an acquired lock in accordance with a corresponding client crash according to some embodiments of the present disclosure.

Referring to FIG. 2, in the present example, the first client 110 requests the write lock at 241, and receives the write lock at 244 after the NKV target 130 determines at 242 whether a write lock or a read lock exists (and has not expired), and determines at 243 whether there is a prior different lock request that has priority over the request from the first client 110 (e.g., waiting in the PQ), in a manner similar to that discussed with respect to FIG. 1 above. Also, as discussed above, the second client 120 subsequently requests a write lock at 245 after the request by the first client 110, and thus, the request by the first client 110 may be executed before that of the second client 120. Thus, in the present example, the first client 110 may be granted the write lock at 244, and the lock request of the second client 120 may be appended to the PQ for later retrieval (e.g., see 156 in FIG. 1). However, the present disclosure is not limited thereto, and in some embodiments, a subsequent request may be executed before a previously received request depending on the client(s) making the request(s), a type of device of the client(s) making the request(s), a type of the request(s), and/or the like.

However, prior to writing back the object key to the NKV target 130 (e.g., prior to submitting a PUT request at 149 to write back the object key to the NKV target 130, as shown in FIG. 1), the first client 110 crashes (e.g., becomes non-responsive or otherwise unreachable) at 246. In the present example, the NKV target 130 is programmed to release the write lock granted to the first client 110 in accordance with a target that determines that the NKV client connection is lost, or in accordance with the write lock request that is received from the second client 120, once the epoch has expired at 247 (e.g., once a determination is made that it may be assumed that the first client 110 has crashed), whichever happens earlier.

Accordingly, the NKV target 130 thereafter releases the write lock (e.g., without sending a status update to the presumably crashed first client 110), and is then free to grant the write lock request to the second client 120 at 248 (e.g., waiting in the PQ, and assuming no other requests in the PQ with a higher priority).

Figure 3:
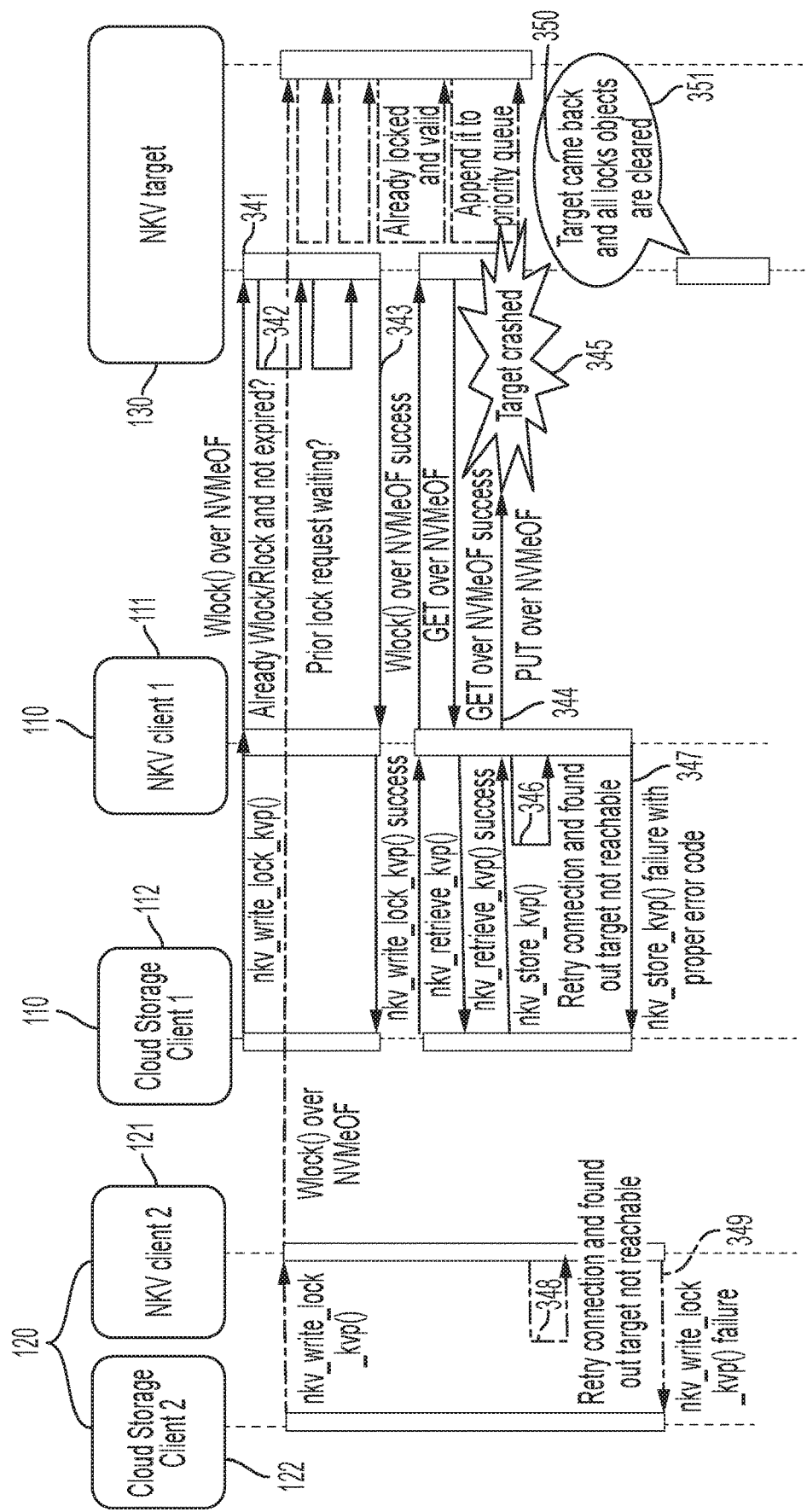
FIG. 3 shows a timing diagram depicting a method for releasing all locks in accordance with a network key-value (NKV) target crash when a client has acquired a lock.

FIG. 3 is a timing diagram depicting a method for releasing locks in accordance with an NKV target crash when a client has acquired a lock.

Referring to FIG. 3, as in the two previous examples described with respect to FIGS. 1 and 2, the first client 110 may request the lock at 341 with the second client 120 subsequently requesting the lock at 342. Then, the NKV target 130 may grant the lock to the first client 110 at 343, and the lock request of the second client 120 may be appended to the PQ for later retrieval (e.g., see 156 in FIG. 1).

However, while the first client 110 is writing back, or is attempting to write back, the key object from the NKV target 130 at 344, the NKV target 130 crashes at 345. At that time, the first client 110 (e.g., the first NKV client 111) may attempt to reestablish a connection with the NKV target 130 at 346, and may determine that the NKV target 130 is not reachable. At 347, the first NKV client 111 may send an alert (e.g., an error code) to the first cloud storage client 112, indicating that the NKV target 130 is no longer reachable (e.g., the first NKV client 111 may send the message "nkv_store_kvp( ) failure" with a proper error code to indicate that the first NKV client 111 has determined that the NKV target 130 has failed).

Similarly, after a sufficient amount of time (e.g., a threshold amount of time) has passed, the second client 120 may attempt to reestablish a connection with the NKV target 130 at 348, and may determine that the NKV target 130 is not reachable. Accordingly, the second NKV client 121 may similarly send an alert to the second cloud storage client 122 at 349, indicating that the NKV target 130 is no longer reachable (e.g., nkv_write_lock_kvp( ) failure).

Once the NKV target 130 comes back online at 350 thereafter, the NKV target 130 may clear the locks for its objects (e.g., object keys) at 351. In this case, in some embodiments, the NKV target 130 may be reset without maintaining any locks, and the NKV clients may detect the crash and may attempt to lock the NKV target 130 again.

Figure 4:
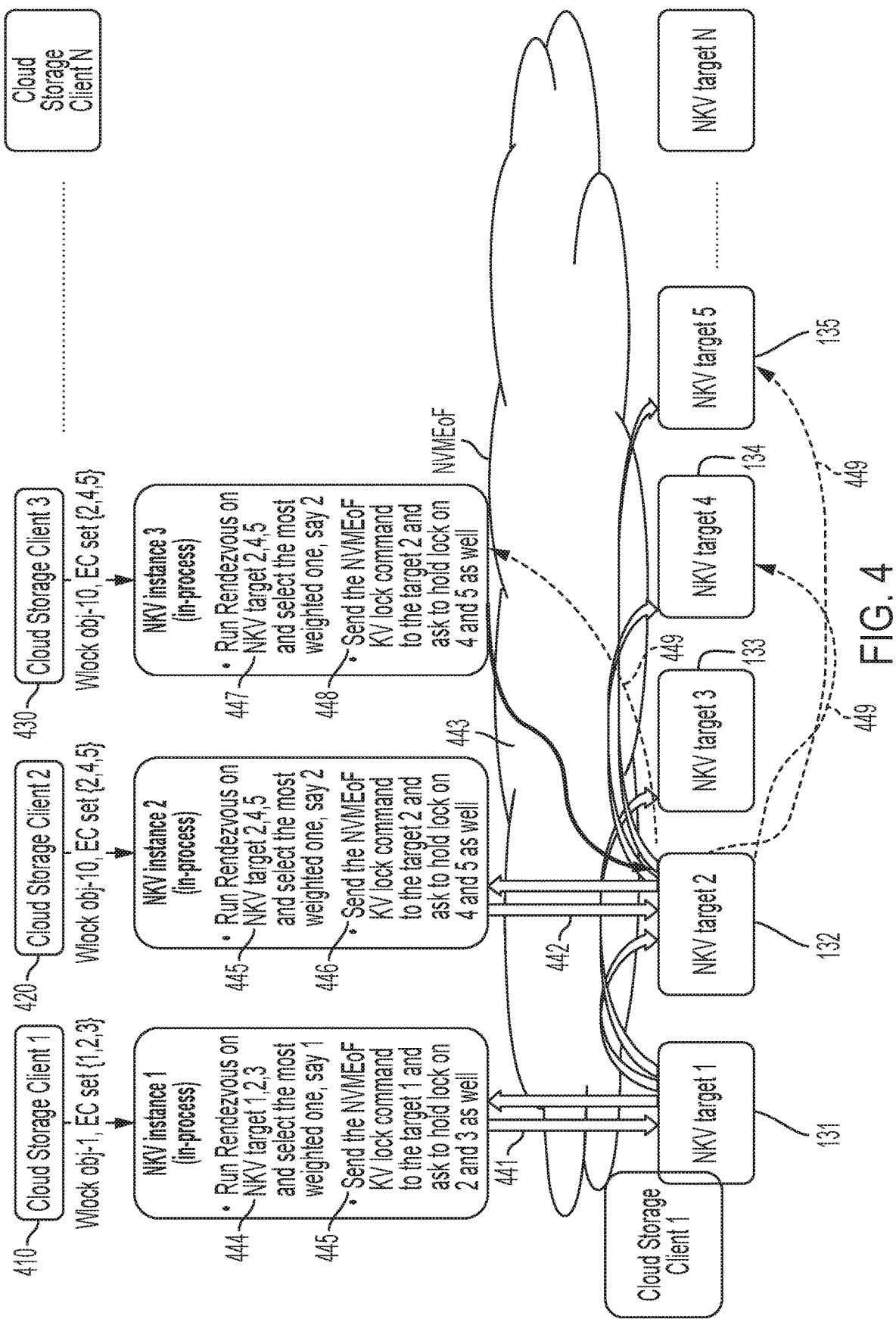
FIG. 4 shows a block diagram depicting a method for obtaining a lock across multiple NKV targets according to some embodiments of the present disclosure.
Figure 5:
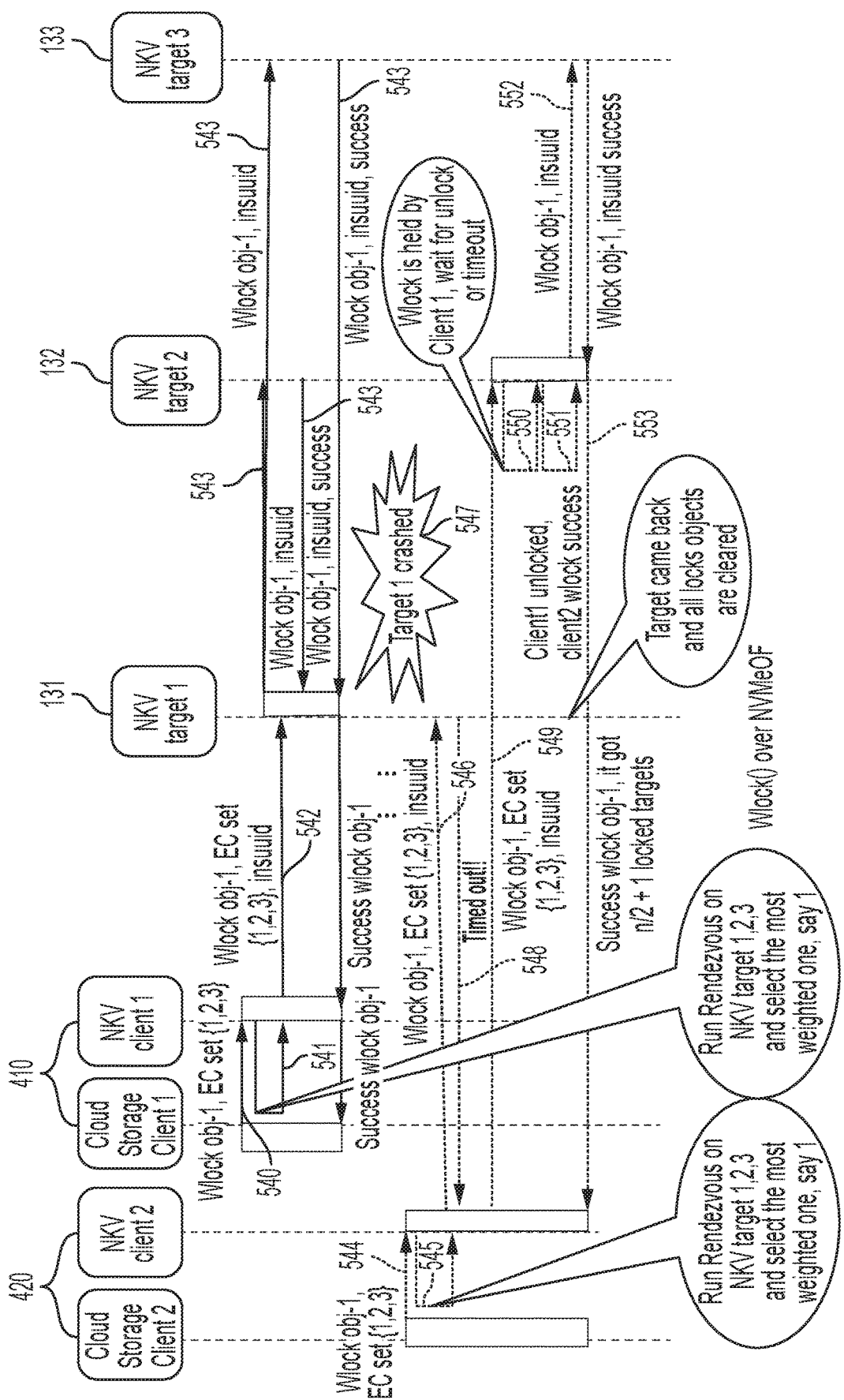
FIG. 5 shows a timing diagram depicting a method for releasing an acquired lock in accordance with a master NKV target node crash according to some embodiments of the present disclosure.

FIG. 4 is a block diagram depicting a method for obtaining a lock across multiple NKV targets according to some embodiments of the present disclosure, and FIG. 5 is a timing diagram depicting a method for releasing an acquired lock in accordance with a master NKV target node crash according to some embodiments of the present disclosure.

In accordance with some of the embodiments disclosed herein, the NKV side provides a highly available lock-service. For example, the application may make a request for a non-blocking lock (e.g., a request for a lock corresponding to a single object) or for a blocking lock (e.g., a request for a lock across all objects of one or more NKV targets of the cluster) via the NKV API. In response, the NKV client may run an algorithm (e.g., a hashing algorithm, such as a Rendezvous hashing algorithm or a highest random weight (HRW) hashing algorithm) to determine which NKV target of multiple NKV targets is to be selected. For example, the selected NKV target may be determined to be the most weighted according to the HRW hashing algorithm. The HRW hashing algorithm allows multiple clients to achieve distributed agreement on a subset of options out of a larger possible set of options (e.g., whether to select a first NKV target or a second NKV target out of a cluster that includes at least one other possible NKV target in addition to the first and second NKV targets). The selected NKV target (e.g., the NKV target that is determined to be the most weighted) may be referred to as a master lock node for the hashed object key.

The lock request for an object key may be limited to the same NKV target unless the NKV client corresponding to the master lock node crashes or otherwise becomes disconnected from the network. If the master lock node does crash, the next-most-weighted target node (e.g., next-most-weighted as determined by the Rendezvous hashing algorithm) may be selected as the master lock node.

The application, via the NKV API, may provide a limited number of target nodes that the application intends to have locked (e.g., via EC/replication set). A node from among a number of target nodes that has the greatest weight, as determined by a hashing algorithm, may be designated as a master lock node, while the other remaining nodes may be designated as slave lock nodes.

The master lock node may generate a lock request for the object key, and may send the lock request to the other slave nodes. A lock may be successfully acquired by the master lock node if the master lock node is able to obtain a quorum of NKV target node locks (e.g., at least N/2+1 NKV target node locks, N being the number of target nodes in the client request). That is, a lock may be successfully acquired by the master lock node if a majority of target nodes in the client request are able to be locked. This ensures integrity in the event that one or more of the target nodes suffer an unexpected failure while otherwise operating in an error free scenario, such that all requested target locks may be acquired before sending a response back. Otherwise, based on whether the lock request is a blocking lock request or a non-blocking lock request, the system may either wait on the already locked target node(s), or may return an alert indicating that an error has occurred.

The Rendezvous/HRW hashing algorithm may use two parameters—a key (e.g., an object key corresponding to a value to be stored on one of the NKV targets), and a target ID (e.g., a unique identifier or an input/output (IO) identification corresponding to each of the NKV targets on which the data is to be stored). Accordingly, because selection of the master lock node is based on a hashing algorithm, all of the NKV target nodes may have the ability to be selected as either a master lock node or as a slave lock node for different respective object keys based on the respective hash results of the respective object key with each target ID.

It should be noted that the NKV cluster may ensure that a lock is always available even in the event that the master lock node or a slave lock node loses power or otherwise crashes. For example, if the master lock node dies, the next-most-highly weighted node may be automatically chosen as the new master lock node by the NKV clients (e.g., by using the Rendezvous hashing algorithm). Accordingly, the master lock node either may be blocking, or may return an alert to any node (e.g., any node in an EC/replication set) to indicate an error (e.g., in the event of a non-blocking lock request) in case a valid lock is present for that object key. Accordingly, locks may be available as long as a majority of requested NKV target nodes remain operational (e.g., as long as N/2+1 NKV target nodes remain operational, N being an integer representing the number of NKV target nodes in the client request).

In the event that one of the NKV clients or the NKV target dies, stale locks may be handled properly (e.g., by using a reasonably sized time-out for determining an amount of time for which the NKV clients or the NKV target may remain inactive on the network before they are presumed to have crashed or otherwise lost operationality). This may be achieved in a manner that is similar to that discussed above with respect to a multiple-client/single-target scenario.

Referring to FIG. 4, in the present example, a first client 410 seeks access at 441 to first, second, and third NKV targets 131, 132, and 133, a second client 420 seeks access at 442 to second, fourth, and fifth NKV targets 132, 134, and 135, and a third client 430 also seeks access at 443 to the second, fourth, and fifth NKV targets 132, 134, and 135.

For the first NKV instance at 441, a hashing algorithm (e.g., Rendezvous) is run with regard to the first, second, and third NKV targets 131, 132, and 133, and the most weighted NKV target is selected (e.g., the first NKV target 131 is selected as the most weighted) at 444. The most weighted NKV target, the first NKV target 131 in the present example, is assigned the role of master lock node. Accordingly, the first client 410 sends the NKV lock command to the first NKV target 131, and requests that a lock be held on the second and third NKV targets 132 and 133 as well at 445.

Similarly, for the second NKV instance at 442, the hashing algorithm is run with regard to the second, fourth, and fifth NKV targets 132, 134, and 135, and the most weighted NKV target 130 is selected (e.g., the second NKV target 132 is selected as the most weighted) and assigned the role of master lock node at 446. Accordingly, the second client 420 sends the NKV lock command to the second NKV target 132, and requests that a lock be held on the fourth and fifth NKV targets 134 and 135 as well.

Finally, for the third NKV instance at 443, the hashing algorithm is run with regard to the second, fourth, and fifth NKV targets 132, 134, and 135, and the most weighted NKV target is selected (e.g., again, the second NKV target 132 is selected as the most weighted) and assigned the role of master lock node at 447. Accordingly, at 448, the third client 430 sends the NKV lock command to the second NKV target 132, and requests that a lock be held on the fourth and fifth NKV targets 134 and 135 as well. However, the third client 430 might not successfully be granted a lock (e.g., might not receive a write lock) while the second client 420 has not released the lock, or while the lock obtained by the second client 420 has not expired at 449.

Referring to FIG. 5, as with the previous example described with respect to FIG. 4, at 540, a first client 410 seeks access to the first, second, and third NKV targets 131, 132, and 133. A hashing algorithm (e.g., Rendezvous) is run with regard to the first, second, and third NKV targets 131, 132, and 133, and the most weighted NKV target is selected (e.g., the first NKV target 131 is selected) and assigned the role of master lock node at 541. Accordingly, the first client 410 sends the NKV lock command to the first NKV target 131, and requests that a lock be held on the second and third NKV targets 132 and 133, at 542. In accordance with the request, the first NKV target 131 may communicate with the second and third NKV targets 132 and 133 at 543 to have a lock held thereon.

Thereafter, a second client 420 also seeks access to the first, second, and third NKV targets 131, 132, and 133 at 544. Also, the first NKV target 131 is assigned the role of the master lock node at 545. However, upon sending the request for the lock to the first NKV target 131 at 546, the first NKV target 131 crashes (e.g., is non-responsive) at 547. Accordingly, after a suitable amount of time (e.g., a threshold amount of time) has passed, the second client 420 determines that the first NKV target 131 has timed out at 548, and sends a lock request to the next most highly weighted NKV target of the second and third NKV targets 132 and 133 (e.g., in the present example, the second NKV target 132 may be the next most highly weighted NKV target) at 549.

The second NKV target 132 receives the request from the second client 420, and determines that the first client 410 holds a write lock on the second NKV target 132 at 550. Accordingly, at 551, the second NKV target 132 waits until the first client 410 releases the lock and successfully unlocks the second NKV target 132, or waits until a timeout occurs (e.g., if the first client 410 crashes), and then initiates a lock on the third NKV target 133 (per the request of the second client 420) at 552, and returns a status update to the second client 420 at 553 indicating that the second and third NKV targets 132 and 133 have been successfully locked.

Figure 6A:
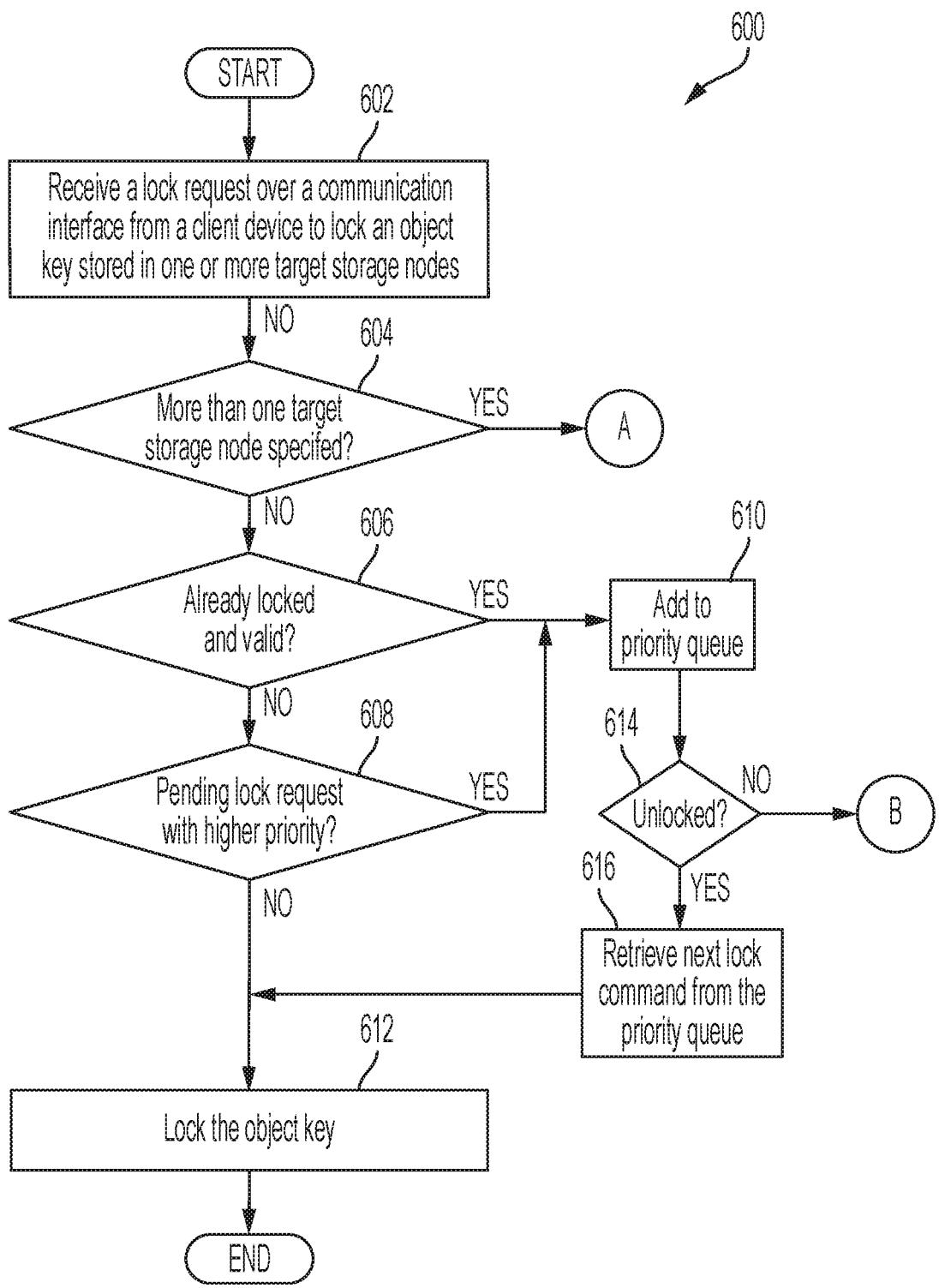
FIGS. 6A-6C show a flowchart depicting a method of coordinating lock requests in an NKV store comprising one or more NKV targets according to some embodiments of the present disclosure.
Figure 6B:
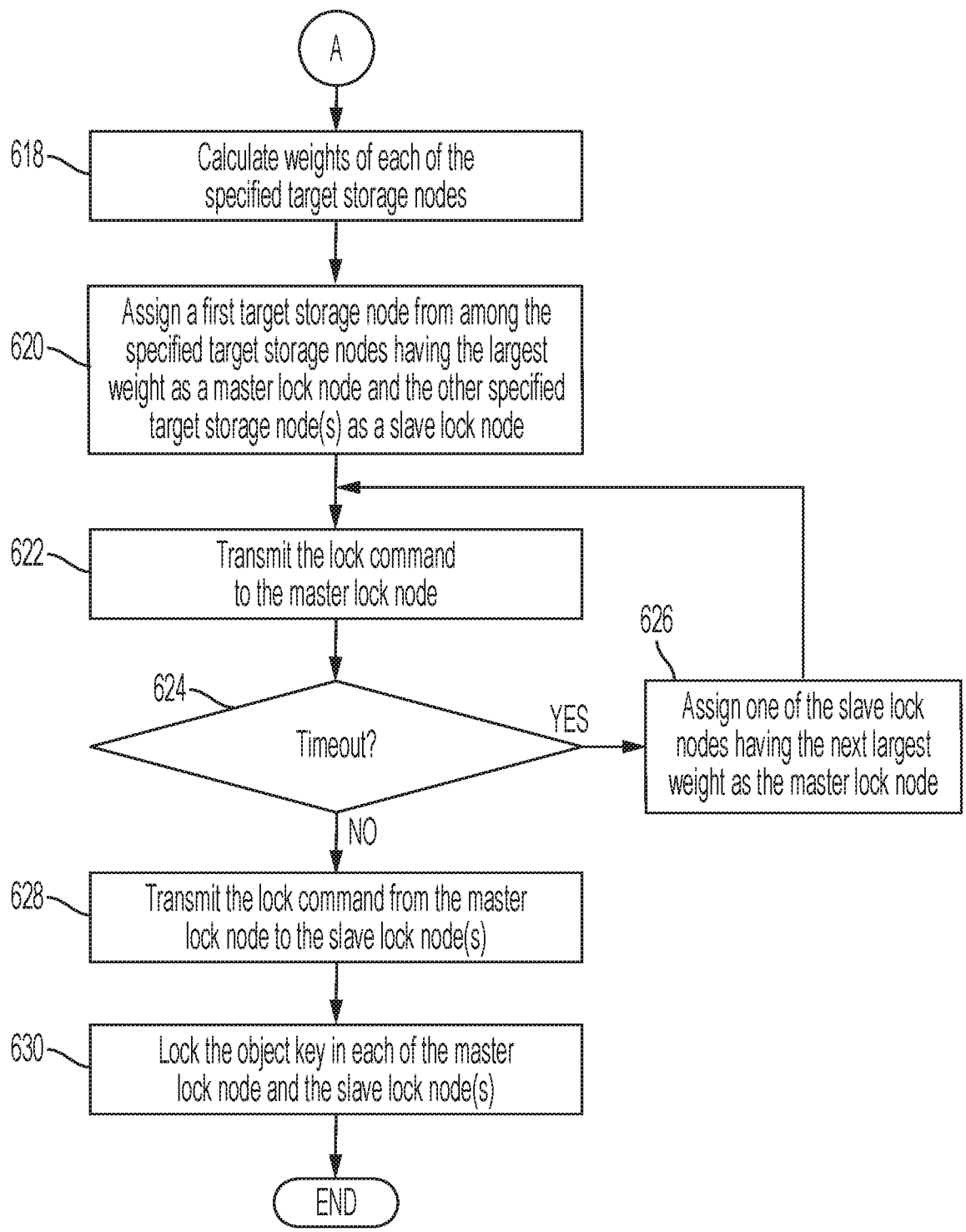
Figure 6C:
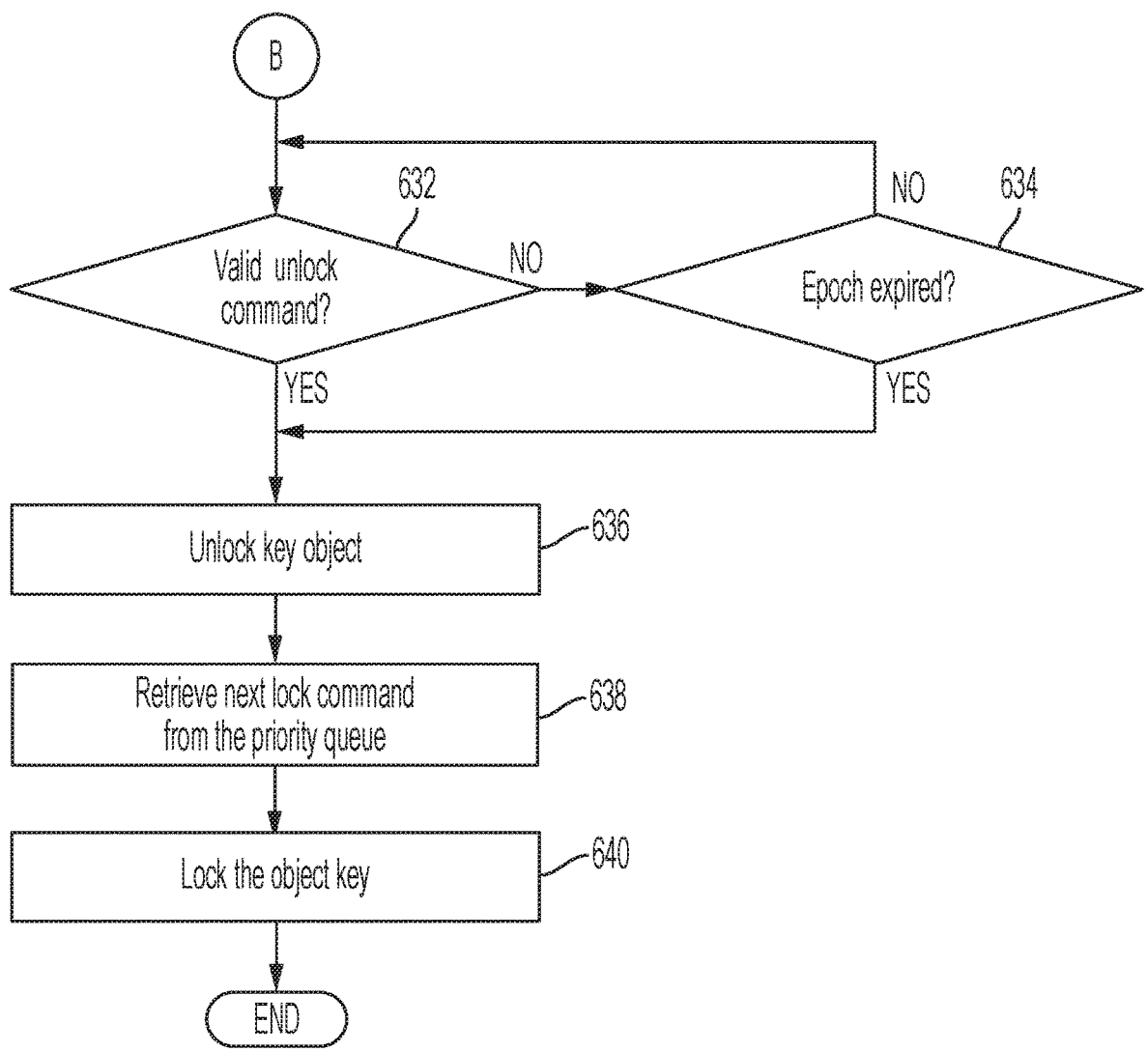

FIGS. 6A to 6C show a flowchart depicting a method of coordinating lock requests in an NKV store comprising one or more NKV targets according to some embodiments of the present disclosure. The present disclosure is not limited to the sequence or number of the operations of the method 600 shown in FIG. 6, and can be altered into any desired sequence or number of operations as recognized by a person having ordinary skill in the art. For example, in some embodiments, the order may vary, or the method 600 may include fewer or additional operations. Further, the operations shown in the method 600 may be performed by any suitable one of the components, or by any suitable combination of the components, of one or more of the example embodiments described above.

Referring to FIG. 6A, a lock request may be received over a communication interface from a client device to lock an object key stored in one or more target storage nodes at 602. For example, in some embodiments, an NKV client may receive a lock request command API from a cloud storage client to lock an object key stored in one or more NKV targets. A determination may be made whether more than one target storage node is specified at 604. For example, in some embodiments, the NKV client may analyze the lock request to determine whether the cloud storage client has specified more than one NKV target in the lock request. If more than one target storage node is specified at 604 (e.g., YES), then the method 600 may continue at A, which will be described in more detail below with reference to FIG. 6B.

If only one target storage node is specified at 604 (e.g., NO), then a determination may be made whether there is already a lock and whether the lock is valid at 606. For example, in some embodiments, the NKV client may translate the lock command and may transmit the lock command to the specified NKV target over the storage interface (e.g., NVMeOF). The specified NKV target may make the determination at 606. If the object key is already validly locked at 606 (e.g., YES), then the lock command may be added to a priority queue (PQ) at 610 for later retrieval. If the object key is not locked and valid at 606 (e.g., NO), then a determination may be made whether there are any pending lock requests with a higher priority at 608. For example, the specified NKV target may check the PQ to determine whether there are any pending requests in the PQ with a higher priority at 608. If so (e.g., YES), then the lock request may be added to the PQ at 610 for later retrieval. On the other hand, if there no higher priority pending requests at 608 (e.g., NO), then the object key may be locked at 612. In this case, a success response may be transmitted to the client (e.g., the NKV client) that made the request, and the method 600 may end.

In some embodiments, if the lock request is added to the PQ at 610, then a determination may be made whether the corresponding object key has been unlocked (e.g., at a suitable time after the lock request is added to the PQ) at 614. For example, in some embodiments, the specified NKV target may determine whether the object key has been unlocked by a valid unlock command, or the target command scheduler may determine whether the epoch for the lock has expired. Thus, if the object key has not been unlocked at 614 (e.g., NO), then the method 600 may continue at B, which will be described in more detail below with reference to FIG. 6C. On the other hand, if the object key has been unlocked at 614 (e.g., YES), then a next lock command may be retrieved from the priority queue at 616, and the object key may be locked at 612 according to the next lock command. In some embodiments, if one or more of the next highest priority lock commands are a reader lock, the specified NKV target may continue through the priority queue until a next highest priority write lock command is encountered, and may grant all of the previous reader lock commands concurrently (e.g., simultaneously or at the same or substantially the same time). In this case, a success response may be transmitted to the client that made the request (e.g., the NKV client issuing the next lock command), and the method 600 may end.

Referring to FIGS. 6A and 6B, if more than one target node is specified in the lock request at 604 (e.g., YES), then weights of each of the specified target storage nodes may be calculated (e.g., by using a hashing algorithm) at 618. For example, the NKV client may calculate the weights for each of the specified target storage nodes using any suitable hashing algorithm (e.g., the Rendezvous hashing algorithm). A first target storage node from among the specified target storage nodes having the largest weight may be assigned as a master lock node, and the other specified target storage node(s) may be assigned as a slave lock node at 620, and the lock command may be transmitted to the master lock node at 622. For example, the NKV client may assign the master lock node and the slave lock nodes based on their weights, and may transmit the lock command to the master lock node with a request that the lock also be held on the slave node(s).

A determination may be made whether a timeout occurs at 624. For example, in some embodiments, the NKV client may wait for a success response from the master lock node, and once a suitable threshold time is exceeded, the NKV client may assume that the master lock node has crashed (e.g., is non-responsive). In this case (e.g., YES at 624), one of the slave lock nodes having the next largest weight may be assigned as the master lock node at 626. For example, the NKV client may assign one of the specified target storage nodes having the next largest weight as a new master node. The lock command may be transmitted to the new master node at 622, and the method 600 may continue at 624 to determine whether the new master node has crashed (and if so, assigns another new master node from among the specified target nodes having the next highest weight).

If the timeout does not occur at 624 (e.g., NO), then the master lock node may transmit the command to the slave lock node(s) at 628, and the object key may be locked in each of the master lock node and the slave lock node(s) at 630 (e.g., using the method 600). In this case, a success response may be transmitted to the client (e.g., the NKV client), and the method 600 may end. In other embodiments, the master lock node may obtain a quorum of NKV target node locks as described above. Further, in the event of a failure of a slave node, an indication of a successful lock may be returned as long as a quorum number of the slave nodes (e.g., N/2+1) are able to successfully acquire the lock.

Referring to FIGS. 6A and 6C, if the object key is not unlocked at 614, then a determination may be made whether a valid unlock command has been received at 632. For example, the NKV target may determine whether an unlock command was received from the NKV client that locked the object key. If a valid unlock command has not been received at 632 (e.g., NO), then a determination may be made as to whether an epoch for the object key has expired at 634. For example, in some embodiments, the target command scheduler or a next lock request may determine whether the epoch has expired at 634. If not (e.g., NO at 634), the NKV target may continue to wait for a valid unlock command.

On the other hand, if the epoch has expired at 634 (e.g., YES), the NKV target may assume that the NKV client that made the lock has crashed (e.g., is non-responsive), and the key object may be unlocked at 636. A next lock command having the highest priority of the remaining lock commands may be retrieved from the PQ at 638, and the object key may be locked at 640. In this case, a success response may be transmitted to the client that made the request (e.g., the NKV client that issued the next lock command), and the method 600 may end.

Accordingly, embodiments of the present disclosure provide an improved method and system for data storage by providing underlying storage services, or storage methodology, that provide a uniform lock mechanism for ensuring data consistency, thereby improving a range of design options for object storage devices that are compatible with the disclosed embodiments, and thereby improving overall performance of clients and targets in a cluster. Further, the use of the lock methodology of the embodiments described above may be used with applications to ensure data consistency.

While embodiments of the present disclosure have been particularly shown and described with reference to the accompanying drawings, the specific terms used herein are only for the purpose of describing the invention and are not intended to define the meanings thereof or be limiting of the scope of the invention set forth in the claims. Therefore, those skilled in the art will understand that various modifications and other equivalent embodiments of the present disclosure are possible. Consequently, the true technical protective scope of the present disclosure must be determined based on the technical spirit of the appended claims, with functional equivalents thereof to be included therein.

What is claimed is:

1. A method of coordinating lock requests in a network key-value (NKV) data store, the method comprising:
   transmitting NKV data using a non-volatile memory express over fabrics (NVMe-oF) protocol;
   storing the NKV data as a key-value pair in which a key serves as a unique identifier;
   receiving, by a client of the data store, a lock request from a client device of a storage client over a communication interface to lock an object key stored in a target;
   determining, by the client, that the target corresponds to the lock request;
   transmitting, by the client, the lock request to the target over a storage interface;
   determining, by the target, a priority of the lock request; and
   locking, by the target, the lock request based on the priority.

2. The method of claim 1, wherein the communication interface comprises an application programming interface (API).

3. The method of claim 2, wherein the API is available and a majority number of one or more targets comprising the target are available.

4. The method of claim 1, wherein the storage interface comprises a NVMe-oF interface.

5. The method of claim 1, wherein determining of the priority of the lock request comprises:
   checking, by the target, a priority queue; and
   determining, by the target, the priority of the lock request based on a number of requests in the priority queue.

6. The method of claim 5, further comprising:
   determining, by the target, that the object key is locked; and
   adding, by the target, the lock request to the priority queue.

7. The method of claim 6, further comprising:
   determining, by the target, the object key is unlocked; and
   executing, by the target, a next lock request from the priority queue.

8. The method of claim 7, wherein determining the object key is unlocked comprises:
   determining, by the target, a valid unlock command is received from a second target that locked the object key; or
   determining, by the target, an epoch is expired for the object key,
   wherein the object key is unlocked in response to the valid unlock command or the epoch being expired.

9. The method of claim 1, further comprising:
   determining, by the client, a weight of the target using a hashing algorithm;
   identifying, by the client, the target as having a largest weight from among targets comprising the target;
   assigning, by the client, the target as a master lock node; and
   assigning, by the client, a second target of the targets as a slave lock node,
   wherein the lock request indicates specified ones of the targets.

10. The method of claim 9, wherein transmitting the lock request to the target comprises:
    transmitting, by the client, the lock request to the master lock node, wherein the lock request includes a request that the lock also be held on the slave lock node, and
    wherein the master lock node transmits the lock request to the slave lock node.

11. The method of claim 9, further comprising:
    transmitting, by the client, the lock request to the master lock node;
    determining, by the client, a timeout; and
    assigning, by the client, a third target of the targets having a next largest weight as a new master lock node.

12. A non-transitory computer readable medium comprising instructions that when executed by one or more processors of a non-volatile memory express over fabrics (NVMeOF) key-value (NKV) data store causes the one or more processors to perform a method comprising:
    transmitting NKV data using a NVMe-oF protocol;
    storing the NKV data as a key-value pair in which a key serves as a unique identifier;
    receiving a lock request from a client device of a storage client over a communication interface to lock an object key stored in a target;
    determining the target corresponds to the lock request;
    transmitting the lock request to the target over a storage interface;
    determining a priority of the lock request; and
    locking the lock request based on the priority.

13. The non-transitory computer readable medium of claim 12, wherein the communication interface comprises an application programming interface (API), and the storage interface comprises a NVMe-oF interface.

14. The non-transitory computer readable medium of claim 12, wherein, to determine the priority of the lock request, the instructions further cause the one or more processors to perform the method by:
    checking a priority queue; and
    determining the priority of the lock request based on a number of requests in the priority queue.

15. The non-transitory computer readable medium of claim 14, wherein the instructions further cause the one or more processors to perform the method by:
    determining that the object key is locked; and
    adding the lock request to the priority queue.

16. The non-transitory computer readable medium of claim 15, wherein, to determine the object key is unlocked, the instructions further cause the one or more processors to perform the method by:
    determining a valid unlock command is received from a corresponding target that locked the object key; or
    determining an epoch is expired for the object key, and
    wherein the object key is unlocked in response to the valid unlock command or the epoch being expired.

17. The non-transitory computer readable medium of claim 12, wherein the lock request corresponds to a first target of targets, and wherein the instructions further cause the one or more processors to perform the method by:
- determining respective weights for the targets using a hashing algorithm;
- identifying the first target as having a largest weight from among the targets;
- assigning the first target as a master lock node; and
- assigning a second target of the targets as a slave lock node.

18. The non-transitory computer readable medium of claim 17, wherein, to transmit the lock request to the first target, the instructions further cause the one or more processors to perform the method by:
- transmitting the lock request to the master lock node, wherein the lock request includes a request that the lock also be held on the slave lock node, and
- wherein the master lock node transmits the lock request to the slave lock node.

19. The non-transitory computer readable medium of claim 18, wherein the instructions further cause the one or more processors to perform the method by:
- transmitting the lock request to the master lock node;
- determining a timeout; and
- assigning a third target of the targets having a next largest weight as a new master lock node.

20. A system for coordinating lock requests in a network key-value (NKV) data store for storing NKV data as a key-value pair in which a key serves as a unique identifier, the system being configured to:
- transmit NKV data using a non-volatile memory express over fabrics (NVMe-oF) protocol;
- store the NKV data as a key-value pair in which a key serves as a unique identifier;
- receive, by a client, a lock request from a client device of a storage client over a communication interface to lock an object key stored in a target;
- determine, by the client, the target corresponds to the lock request;
- transmit, by the client, the lock request to the target over a storage interface;
- determine, by the target, a priority of the lock request; and
- lock, by the target, the lock request based on the priority.

* * * * *